Figure 1:
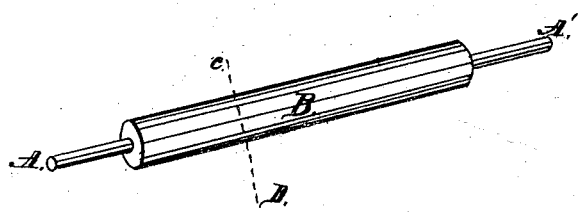
Figure 2:
Figure 3:

J. M. BATCHELDER.
INSULATING TELEGRAPH WIRES.

No. 11,058. PATENTED JUNE 13, 1854.

UNITED STATES PATENT OFFICE.

JOHN M. BATCHELDER, OF CAMBRIDGE, MASSACHUSETTS.

IMPROVEMENT IN INSULATING TELEGRAPH-WIRES.

Specification forming part of Letters Patent No. 11,058, dated June 13, 1854.

*To all whom it may concern:*

Be it known that I, JOHN M. BATCHELDER, of Cambridge, in the county of Middlesex and State of Massachusetts, have invented certain Improvements in the Insulation of Electric-Telegraph Wires; and I do hereby declare that the following is a full, clear, and exact description of the construction and use of the same, reference being had to the annexed drawings, making a part of this specification, in which—

Figure I is a perspective view of the telegraph wire or conductor with its covering; Fig. II, section of the same on the line C D, Fig. I; Fig. III, longitudinal section of the same.

The wire A A' is made of copper, iron, or any other metal that is a good conductor of electricity, and has upon or around it a coating, B, composed of whalebone, rubber, or bone-gum, sometimes termed "hard rubber." This substance is well known in the arts, and is the same for which Letters Patent were granted to Nelson Goodyear, of the city of New York, on the 6th day of May, A. D. 1851, the claims in this patent being in the words following:

"I do not claim the 'heating or curing process,' as it is termed, that having been patented by Charles Goodyear.

"What I do claim as my invention is—

"The combining of india-rubber and sulphur, either with or without shellac, for making a hard and inflexible substance hitherto unknown, substantially as herein set forth."

The coating of whalebone-rubber should be about one-eighth of an inch in thickness, or of such thickness as to insure the perfect insulation of the wire when immersed in water. The wire may be coated or covered in various ways. It may be applied in the form of a fillet or ribbon one or two inches in width and wound spirally about the wire; or a band may be cut of suitable width, and (after being scarfed at the edges) wrapped around the wire. When this is done the covered wire is subjected to the baking or curing process above referred to, which hardens the covering and renders it one of the best of electrics or non-conductors of electricity. The covered wire is coiled while subjected to the process of curing, and retains this form after it is withdrawn from the heater. The coils may be straightened by passing the wire slowly over a charcoal fire. After it is cooled it may be again coiled, and will afterward when unrolled assume a straight line.

What I claim, and desire to secure by Letters Patent, is—

The combination of an electric-telegraph wire or conductor with a composition of india-rubber and sulphur, forming an insulating-coating upon and around the wire, this composition being the same for which a patent was granted to Nelson Goodyear on the 6th day of May, 1851, and herein referred to.

Signed and sealed in the city of New York on the 8th day of April, 1854.

JOHN M. BATCHELDER. [L. S.]

In presence of—
 ROYAL A. GAINES,
 THOMAS S. HOFFMAN.